United States Patent Office 3,067,166
Patented Dec. 4, 1962

3,067,166
STABILIZED HALOGEN CONTAINING VINYL RESINS
Baruch Zaremsky, South Euclid, Ohio, assignor to Ferro Corporation, Cleveland, Ohio, a corporation of Ohio
No Drawing. Filed Sept. 17, 1959, Ser. No. 840,526
27 Claims. (Cl. 260—45.75)

This invention relates generally to a halogen containing vinyl resin composition which has been compounded so as to minimize the deleterious effects of heat.

More particularly, this invention relates to a new and novel composition of matter and method of achieving same whereby certain compounds, when combined in a vinyl resin composition in certain relative amounts, result in a degree of heat stabilization far superior to their individual contribution if incorporated singly.

Halogen containing vinyl resins have assumed an increasingly dominant position at both the consumer and industrial levels.

Polymers and co-polymers of halogen-containing vinyl resins find wide application in coating compositions, fibers, sheets and innumerable useful and decorative articles manufactured by various molding and pressing techniques.

However, since their inception, one of the most bothersome drawbacks to their utility and durability has been the degrading effect of heat on said resins resulting in yellowish discoloration, which renders them unattractive and unsalable.

In the past, there have been a number of stabilizers marketed for overcoming these defects, but I have found my invention to be more economical and to achieve more lasting stability than devices relied upon heretofore.

It is therefore an object of this invention to provide a stabilization system for minimizing the deleterious effects of heat on halogen containing vinyl resins.

Another object resides in my unique composition comprising halogen containing vinyl resins and stabilizing compounds in certain quantities as hereinafter described.

It is an object of this invention to provide halogen containing vinyl resin compounds, which compounds may be subjected to relatively high temperatures for relatively long periods of time without undergoing marked changes in color.

Broadly stated, this invention lies in combining certain esters, with certain metals in the form of salts, to provide significantly much improved heat stabilization properties in halogen containing vinyl resin systems, each of which compounds i.e., certain esters and certain metal compounds, when relied upon singly, surprisingly, have little or no heat stabilizing effect.

The esters of the present invention are obtainable by a reaction between a mercapto acid of the following general composition:

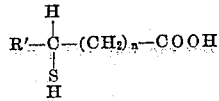

where $n$ is an integer from 0 to 5, and where R' is selected from the group consisting of hydrogen; cycloalkyl, such as cyclohexyl, cyclopentyl, methylcyclohexyl, etc.; alkyl, such as methyl, ethyl, propyl, isooctyl, 2-ethyl butyl, 1,1,3,3-tetramethylbutyl, etc.; aralkyl, such as benzyl, tolyl, xylyl, etc.; alkoxyalkyl, such as methoxyethyl, ethoxypropyl, etc.; alkaryl, such as ethylphenyl, octylphenyl, etc.; or aryl, such as phenyl, naphthyl, etc.; and a primary alcohol of the following general composition:

R''(OH)

wherein R'' is selected from the group consisting of alkyl, e.g., stearyl, lauryl, 2-ethyl hexyl, isooctyl, decyl, etc.; aralkyl, e.g., benzyl, tolyl, xylyl, etc.; or cycloalkyl, e.g. cyclohexyl, cyclopentyl, methylcyclohexyl, etc. to produce an ester of the following structure:

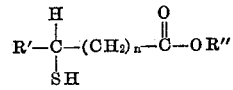

In accomplishing my invention, while I have found the esters of primary alcohols and thioglycollic acid to produce the most outstanding results, when used in combination with zinc or tin compounds, I have also found that other esters such as those resulting from the reaction between a mercaptopropionic acid and a primary alcohol, render equally desirable results.

And, although the ester resulting from thioglycollic acid and stearyl alcohol does, as stated above, give me outstanding results, I find also that other primary alcohols such as lauryl and isooctyl, reacted with thioglycollic acid, result in esters (lauryl thioglycollate and isooctyl thioglycollate) which also provide an outstanding degree of heat stabilization, when used in combination with zinc or tin compounds.

Surprisingly, only compounds of zinc and tin provide effective heat stabilization in combination with the mercapto acid/primary alcohol ester—the salts of cadmium, iron, titanium and other metals providing little or no heat stability for the vinyl resin compositions. In accordance with the present invention, the useful metal is a colorless Friedel-Crafts cation progenitor such as zinc and tin. The above named properties are all required to obtain a polyvinyl halide composition having good heat stability and, in particular, having outstanding early resistance to discoloration (i.e., no degradation until just before failure or heavy discoloration) even upon subjection to high temperatures, say even as high as 350 to 375° F. or even more.

In most cases, there is no discoloration whatsoever in the early stages of testing and this outstanding early heat stability continues almost up until a point of discoloration which is very rapid once it is started. Apparently, the stability and the colorless properties of the Friedel-Crafts cation progenitor makes some difference in the behavior of the Friedel-Crafts cations since salts of metals such as iron do not work with the mercapto acid/primary alcohol ester to impart heat stabilization to the halogen containing vinyl resins. The iron cation is not colorless and is unsatisfactory because of its discoloring effect.

Commercially useful stabilization has been achieved in the practice of this inventive concept with both zinc and tin. For convenience, and thoroughness of distribution, it has been found that these metals are most easily added in the form of salts, but the type of salt or other compound generally is not critical to this invention, a more important consideration being the concentration of metal, per unit weight of resin.

Typical of salts by which either tin or zinc may be introduced are:

| | |
|---|---|
| Formates | Hydroxy stearates |
| Acetates | Chlorides |
| Propionates | Octoates |
| Stearates | Palmitates |
| Oleates | Naphthenates |
| Linolinates | |

The following are examples of preferred mercapto acids which may be reacted with a primary alcohol to produce an ester suitable to the accomplishment of this invention.

Alpha-mercaptopropionic
Beta-mercaptopropionic
Thioglycollic

Listed below are just a few of the preferred primary alcohols which will be found useful in esterifying the mercapto acid hereinbefore described.

| Isooctyl | 2-ethyl hexyl |
| Lauryl | 2-ethyl butyl |
| Stearyl | |

|  | Parts per 100 parts vinyl resin ||||||||||
| --- | --- | --- | --- | --- | --- | --- | --- | --- | --- | --- |
| Sample No. | 1 | 2 | 3 | 4 | 5 | 6 | 7 | 8 | 9 | 10 |
| Stearyl Thioglycollate | 2.0 | 2.0 | 2.0 | 2.0 | 2.0 | 0.0 | 0.0 | 2.0 | 0.0 | 2.0 |
| Zinc 2-ethyl hexoate | 0 | .0008 | .0004 | .002 | .008 | .002 | 0 | 0 | 0 | 0 |
| Stannous Chloride | 0 | 0 | 0 | 0 | 0 | 0 | .006 | .006 | 0 | 0 |
| Zirconyl 2-ethyl-hexoate | 0 | 0 | 0 | 0 | 0 | 0 | 0 | 0 | .006 | .006 |
| (Metal salts are expressed in wt. of metal per 100 parts of resin.) | | | | | | | | | | |

As noted above the preferred alcohols have about 8 to 18 carbon atoms, although primary alcohols having six to 20 carbon atoms are generally suitable.

It has further been found that the results of my invention are greatly enhanced by the addition of a phosphite preferably containing one or more aryl groups to the ester-metal salt combination for extending stability, such as tri alkyl, tri aryl and alkyl aryl phosphites.

It is interesting to note that there are optimum concentrations of the metals, above and below which stability diminishes in one respect or another. However, I have found that increasing the ester from 0 to 3 parts per hundred parts by weight of resin, holding either zinc or tin constant, there is a proportional increase in stability up to 3 parts per hundred. Above 3 parts per hundred, stability is neither greatly improved nor impaired. Therefore, in order to properly define my invention for maximum protection, I may state here that while there is no ceiling or upper limit of the ester concentration other than one of practicality, generally the use of more than 8 to 10 parts by weight of the ester is wasteful.

By way of illustration, then, but not to be considered in any way a limitation upon the innumerable forms and variations this invention might take without departing from its intended scope, are examples of preferred embodiments.

EXAMPLE 1

To illustrate the effect of the combination of an ester of the type and derivation hereinbefore described, with a salt of zinc or tin, as compared to the results of either the ester or metallic salt utilized individually, the following compositions were compounded and tested.

*Standard Plastic Composition*

|  | Parts by weight |
| --- | --- |
| Polyvinyl chloride resin | 100 |
| Di 2-ethylhexyl phthalate | 40 |
| Epoxidized soya bean oil | 5 |
| Stearic acid | ¼ |

While this standard composition has been used because it is a common reference formulation in the commercial testing of polyvinyl chloride, the concept and examples of this invention are equally applicable to the familiar industrial variations, e.g. the resin may be a vinyl chloride-vinyl acetate copolymer, a poly (vinylchloride-vinylidene chloride) copolymer, polyvinyl chloride homopolymer, or a mixture of one or more of these resins with other resins; the plasticizer may be any of several phthalate esters, phosphate esters, esters of straight-chain dicarboxylic acids, epoxidized natural or synthetic esters, or any or all of these mixed with other commercially useful liquefying or plasticizing agents; or no plasticizer may be present; stearic acid or any other lubricant may be present, or may be totally omitted; fillers, opacifiers, pigments, fungicides, antistatic agents may be individually or collectively included or omitted. While the efficacy of the stabilizers used here, and their optimum economic concentrations will naturally vary with the other ingredients of the system; the stabilizer types herein described are understood to be generally applicable to systems using halogen-containing vinyl polymers.

Utilizing the above listed standard plastic composition, common to all the tests, the following samples were set up.

Each batch was weighed out and mixed on a two roll, steam-heated mill at 320° F. for 5 minutes, using conventional procedures, after which samples of the continuous sheet thus formed on the order of 1 mm. x 5 cm. x 5 cm., were suspended in a forced convection oven at a temperature of 365° F. from which the samples were removed every 15 minutes for observation. The first pronounced sign of discoloration was considered failure. All samples were tested simultaneously in this example for maximum accuracy of duplication.

Below are listed the results of the tests:

| Sample No. | Min. to Failure | |
| --- | --- | --- |
| 1 | 15 | Turned dark brown very early. |
| 2 | 105 | Turned slightly yellow early in test, black at failure. |
| 3 | 90 | Do. |
| 4 | 90 | Good early color, black at failure. |
| 5 | 60 | Excellent early color. Black at failure. |
| 6 | 15 | Black at 15 minutes. |
| 7 | 45 | Dark Brown. |
| 8 | 105 | Do. |
| 9 | 15 | Do. |
| 10 | 15 | Dark orange. |

From the above it will be seen that, although the total time to failure at a Zn concentration of 0.0008 and 0.002, was greater for the former, its early color was not quite as clean or clear as that at a concentration of 0.002, which remained clean, clear and discolored up to failure, at which time there was an abrupt discoloration to a deep, brownish black. The same applied to zinc at a concentration of 0.0004 (sample No. 3) which showed poor early color as compared to sample 4. For practical purposes of use therefore, the reaction at a concentration of 0.002 Zn is more indicative of extended commercial stability.

From these results, it will also be seen that, of several metals tested, only zinc and tin, in combination with an ester of the type hereinbefore described, provided commercially advantageous results.

EXAMPLE 2

In order to illustrate the effect on the combination of an ester of the type and derivation hereinbefore described, with a salt of zinc or tin, in further combination with a phosphite containing one or more alkyl groups, such as tri alkyl, tri aryl or alkyl aryl, as compared to the results of the combinations of metal salts with an ester as hereinbefore described without the addition of a phosphite containing one or more alkyl groups, the following compositions were compounded and tested.

*Plastic Composition*

|  | Parts by weight |
| --- | --- |
| Polyvinyl chloride resin | 100 |
| Di 2-ethylhexyl phthalate | 40 |
| Epoxidized soya bean oil | 5 |
| Stearic acid | ¼ |

To the above plastic composition, common to all tests, the following additions were made in order to set up test samples 1 through 7.

| Sample No. | Parts per 100 parts of Vinyl Resin | | | | | | |
|---|---|---|---|---|---|---|---|
|  | 1 | 2 | 3 | 4 | 5 | 6 | 7 |
| Stearyl Thio-glycollate | 2.0 | 2.0 | 2.0 | 2.0 | 2.0 | 2.0 | 2.0 |
| Zinc Octoate | 0.002 | 0.002 | 0.0 | 0 | 0 | 0.002 | 0 |
| Zinc Chloride | 0 | 0 | 0 | 0 | 0 | 0 | 0 |
| Alkyl Aryl Phosphite | 0 | 0.20 | 0.20 | 0.20 | 0.20 | 0.20 | 0.20 |
| Stannic Chloride | 0 | 0 | 0.002 | 0 | 0 | 0 | 0 |
| Ferrous Chloride | 0 | 0 | 0 | 0.002 | 0 | 0 | 0 |
| Titanium Chloride | 0 | 0 | 0 | 0 | 0.002 | 0 | 0 |
| Cadmium Chloride | 0 | 0 | 0 | 0 | 0 | 0 | 0.002 |

In the above table the alkyl aryl phosphite used is a mixture of diisooctyl monophenyl phosphite and isooctyl diphenyl phosphite. Also the zinc octoate used is zinc 2-ethyl hexoate. Throughout the examples the octoate used is 2-ethyl hexoate unless otherwise specified.

As in Example 1, all metal salts are expressed in terms of parts of metal by weight per 100 parts of resin.

Each batch was weighed out and mixed on a two roll, steam-heated mill at 320° F. for 5 minutes, using conventional procedures, and then samples of the continuous sheet thus formed on the order of 1 mm. x 5 cm. x 5 cm, were suspended in a forced convection oven at a temperature of 365° F. from which the samples were removed every 15 minutes for observation. The first pronounced sign of discoloration was considered failure. All samples were tested simultaneously in this example for maximum accuracy of duplication.

Sample No.: Minutes to failure
1 _____ 83
2 _____ 105
3 _____ 75
4 _____ 15
5 _____ 15
6 _____ 105
7 _____ 30

From these results, it will be seen that the addition of alkyl aryl phosphite materially improves the stability when added to the basic plastic composition in combination with stearyl thioglycollate and zinc 2-ethylhexoate.

It will be further seen that salts of the metals such as titanium, iron and cadmium were relatively ineffective, and were in fact inferior to zinc in combination with stearyl thioglycollate in the absence of alkyl aryl phosphite. Also, apparently while stannic and stannous salts may be employed, stannous compounds in which the valence of tin is two, provide the best results. Thus, the metals, tin or zinc, with a valence of two, generally are preferred for most commercial applications.

EXAMPLE 3

As an illustration of the utility of a mercapto acid other than thioglycollic, the following esters of mercaptopropionic acids reacted with stearyl alcohol were investigated:

*Plastic Composition*

Parts by weight
Polyvinyl chloride resin _____ 100
Di 2-ethylhexyl phthalate _____ 40
Epoxidized soya bean oil _____ 5
Stearic acid _____ ¼

Utilizing the above listed plastic composition, common to all the tests, the following samples were set up:

| Sample No. | Parts per 100 parts of resin | | |
|---|---|---|---|
|  | 1 | 2 | 3 |
| Zn 2-ethylhexoate | 0.004 | 0.004 | 0.004 |
| Stearyl Thioglycollate | 2.0 | 0 | 0 |
| Stearyl alpha thiopropionate | 0 | 2.0 | 0 |
| Stearyl beta thiopropionate | 0 | 0 | 2.0 |

Each batch was weighed out and mixed on a two roll, steam-heated mill at 320° F. for 5 minutes, using conventional procedures, after which samples of the continuous sheet thus formed on the order of 1 mm. x 5 cm. x 5 cm. were suspended in a forced convection oven at a temperature of 365° F. from which the samples were removed every 15 minutes for observation. The first pronounced sign of discoloration was considered failure. All samples were tested simultaneously in this example for maximum reliability of comparison.

Sample No.: Minutes to failure
1 _____ 90
2 _____ 105
3 _____ 90

All the above samples had good early color for the first 45 minutes, were all excellent from the standpoint of heat stability.

EXAMPLE 4

As an example of the interchangeability of typical primary alcohols used to esterify a mercapto acid such as thioglycollic, the following tests were run.

*Plastic Composition*

Parts by weight
Polyvinyl chloride resin _____ 100
Di 2-ethylhexyl phthalate _____ 40
Epoxidized soya bean oil _____ 5
Stearic acid _____ ¼

Utilizing the above listed plastic composition, common to all the tests, the following samples were set up.

| Sample No. | Parts per 100 parts of resin | | |
|---|---|---|---|
|  | 1 | 2 | 3 |
| Lauryl thioglycollate | 2.0 | 0.0 | 0.0 |
| Isooctyl thioglycollate | 0.0 | 2.0 | 0.0 |
| Stearyl thioglycollate | 0 | 0.0 | 2.0 |
| Zinc 2-ethylhexoate | 0.003 | 0.003 | 0.003 |
| Tri-phenyl phosphite | 0.06 | 0.06 | 0.06 |

Each batch was weighed out and mixed on a two roll, steam-heated mill at 320° F. for 5 minutes, using conventional procedures, after which samples of the continuous sheet thus formed on the order of 1 mm. x 5 cm. x 5 cm. were suspended in a forced convection oven at a temperature of 365° F. from which the samples were removed every 15 minutes for observation. The first pronounced sign of discoloration was considered failure. All samples were tested simultaneously in this example for maximum reliability of comparison.

Below are listed the results of the tests:

| Sample No.: | Minutes to failure |
|---|---|
| 1 | 60 |
| 2 | 60 |
| 3 | 60 |

From these results it will be seen that, holding the triphenyl phosphite and zince concentration constant, varying the primary esterifying alcohol in reaction with thioglycollic acid to produce an ester as hereinbefore described, and using that ester in combination with zinc to stabilize a halogen containing resin, the time to failure did not vary.

In the above examples, homopolymers of vinyl halides including vinyl chloride and vinyl bromide and vinylidene chloride may be substituted in whole or part for the polyvinyl chloride used therein. Also copolymers of a vinyl halide (preferably vinyl chloride) with vinyl acetate and vinylidene chloride in which the major proportion of the copolymer is vinyl chloride may also be substituted in whole or part for the polyvinyl chloride used in the examples. However it should be noted that the heat stabilization effect in the case of these polymers is much less than with polyvinyl chloride since in general the other polymers darken and discolor much more readily when exposed to heat than polyvinyl chloride. However, in general, similar results are obtained using these other polymers with the two synergystic heat stabilization agents of the present invention.

Also in the above examples, the mercapto acid/primary alcohol esters previously described may be used substituted in whole or part for the mercapto acid esters such as stearyl thioglycollate used in the examples. Likewise, other described zinc and tin salts may be used in place of the particular zinc and tin salts used in the examples to provide benefits of the present invention.

The aryl alkyl phosphite used in Example 2 and the triphenyl phosphite used in Example 4, may be substituted in whole or part by other tri-substituted organic phosphites which preferably have at least one aromatic radical such as phenyl. According to the present invention the phosphite, which provides outstanding results when used with the mercapto acid ester and the zinc or tin salt, may be a phosphite according to the following general formula:

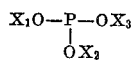

where $X_1$, $X_2$ and $X_3$ are hydrocarbon groups having one to ten carbon atoms; and where $X_1$ is preferably an aryl group such as phenyl and napthyl of which phenyl is outstanding, and $X_2$ and $X_3$ are aryl groups such as phenyl and naphthyl or alkyl groups of one to 10 carbon atoms such as methyl, ethyl, octyl, isooctyl and decyl of which the isooctyl groups are preferred or where $X_2$ and $X_3$ are even alkaryl groups such as nonylphenyl or octylphenyl or aralkyl groups such as benzyl and tolyl.

Thus, for best results, in accordance with the present invention, $X_1$ must be an aryl group, which $X_2$ and $X_3$ may be aryl, alkyl, aralkyl groups or mixture thereof. As previously indicated, excellent results are obtained by the use of tri-hydrocarbon substituted phosphites such as tri-phenyl phosphite, di-isooctyl monophenyl phosphite and di-phenyl isooctyl phosphite in which the substituents are one, two or three phenyl groups and the balance of the substituents are alkyl groups of preferably six to 10 carbon atoms and preferably branch chained.

Having set forth the essence of my invention in just a few of its possible variations, but in sufficient and descriptive detail to permit one skilled in the art to practice said invention in all its possible variations.

What is claimed is:

1. A heat stabilized thermoplastic resin composition comprising an admixture of (1) about 100 parts by weight of a resin of the group consisting of polyvinyl chloride, polyvinylidene chloride, a copolymer of vinyl chloride and vinyl acetate, and a copolymer of vinyl chloride and vinylidene chloride, (2) about ½ to 10 parts by weight of an ester of a mercapto-acid and a primary alcohol having the following general formula:

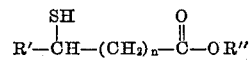

wherein $n$ is an integer from 0 to 5, where R' is selected from the group consisting of hydrogen and alkyl groups and where R'' is selected from the group consisting of alkyl, and cycloalkyl, and (3) about 0.002 to 0.05 part by weight of a metal which is selected from the group consisting of zinc and tin, the metal being a part of a metal salt which is free of carbon to metal bonds.

2. The heat stabilized composition of claim 1 wherein the metal is zinc.

3. The heat stabilized composition of claim 1 wherein the metal is tin.

4. The heat stabilized composition of matter of claim 1 wherein the metal salt is zinc 2-ethyl hexoate.

5. The heat stabilized composition of matter of claim 1 wherein the metal salt is tin chloride.

6. A composition as defined in claim 1 in which the metal salt is zinc octoate.

7. A composition as defined in claim 1 in which the resin is polyvinyl chloride.

8. A composition as defined in claim 1 in which the resin is a copolymer of vinyl chloride and vinyl acetate.

9. A composition as defined in claim 1 in which the resin is polyvinylidene chloride.

10. A composition as defined in claim 1 in which the resin is a copolymer of vinyl chloride and vinylidene chloride.

11. A composition as defined in claim 1 which also includes about 0.01 to 0.5 part by weight of a tri-substituted organic phosphite having the following general formula:

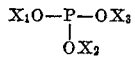

where $X_1$, $X_2$ and $X_3$ are hydrocarbon groups selected from the group consisting of aryl, alkyl, alkaryl and aralkyl radicals.

12. A composition as defined in claim 11 in which at least one of the $X_1$, $X_2$ and $X_3$ groups is a phenyl group.

13. A composition as defined in claim 11 in which the phosphite is tri-phenyl phosphite.

14. A composition as defined in claim 11 in which the phosphite is a mixture of diisooctyl monophenyl phosphite and isooctyl diphenyl phosphite.

15. A heat stabilized resin composition comprising an admixture of (1) about 100 parts by weight of a resin of the group consisting of polyvinyl chloride, polyvinylidene chloride, a copolymer of vinyl chloride and vinyl acetate, and a copolymer of vinyl chloride and vinylidene chloride, (2) about ½ to 10 parts by weight of an ester of a mercapto-acid and a primary alcohol having the following general formula:

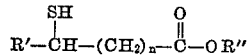

wherein $n$ is an integer from 0 to 5, where R' is selected from the group consisting of hydrogen and an alkyl group, and where R'' is an alkyl group, and (3) about 0.002 to 0.05 part by weight of a metal selected from the group consisting of zinc and tin, the metal being a part of a metal salt in which the metal atom is bound to the balance of the metal salt molecule by a metal to oxygen bond.

16. A heat stabilized resin composition comprising an admixture of (1) about 100 parts by weight of polyvinyl chloride, (2) about ½ to 10 parts by weight of an ester of a mercapto-acid and a primary alcohol having the following general formula:

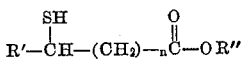

wherein $n$ is an integer from 0 to 5, where R' is selected from the group consisting of hydrogen and alkyl, and where R'' is selected from the group consisting of alkyl, and cycloalkyl, and (3) from about 0.0002 to about 0.05 part by weight of a metal selected from the group consisting of zinc and tin, the metal being a part of a metal salt of an inorganic acid and which salt is a colorless Friedel-Crafts progenitor.

17. A heat stabilized composition of matter comprising an intimate dispersed admixture of (1) about 100 parts by weight of polyvinyl chloride, (2) about 0.5 to 10 parts of an ester of the following general structure:

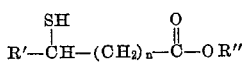

wherein $n$ is an integer from 0 to 5, where R' is selected from the group consisting of hydrogen and alkyl and where R'' is selected from the group consisting of alkyl and cycloalkyl, and (3) about 0.0002 to 0.05 part of a metal which is the metal component of a metal salt of an organic acid the metal being selected from the group consisting of zinc and tin and, said salt being a colorless Friedel-Crafts cation progenitor.

18. A composition of matter comprising an intimate and thoroughly dispersed admixture of a resin of the group consisting of polyvinyl chloride, polyvinylidene chloride, a copolymer of vinyl chloride and vinyl acetate, and a copolymer of vinyl chloride and vinylidene chloride with about 0.5 to 10 parts by weight of stearyl thioglycollate and from 0.0002 to 0.05 part of metal, per hundred parts by resin, of zinc 2-ethylhexoate.

19. A composition of matter comprising an intimate and thoroughly dispersed admixture of about 100 parts by weight of a polymer composed predominantly of polymerized vinyl chloride with from about 0.5 to 10 parts by weight of said resin, of stearyl thioglycollate and from about 0.0002 to 0.05 part metal, per hundred parts by weight of resin, of zinc 2-ethylhexoate.

20. A composition of matter comprising an intimate and thoroughly dispersed admixture of a resin of the group consisting of polyvinyl chloride, polyvinylidene chloride, a copolymer of vinyl chloride and vinyl acetate, and a copolymer of vinyl chloride and vinylidene chloride with from about 0.5 to 10 parts, per hundred parts by weight of said resin, of stearyl thiopropionate and from about 0.0002 to 0.05 part metal, per hundred parts by weight of resin, of zinc 2-ethylhexoate.

21. A composition of matter comprising an intimate and thoroughly dispersed admixture of a resin of the group consisting of polyvinyl chloride, polyvinylidene chloride, a copolymer of vinyl chloride and vinyl acetate, and a copolymer of vinyl chloride and vinylidene chloride with from about 0.5 to 10 parts, per hundred parts by weight of said resin, of stearyl thioglycollate and from about 0.0002 to 0.05 part metal, per hundred parts by weight of resin, of tin chloride.

22. A composition of matter comprising an admixture of a resin of the group consisting of polyvinyl chloride, polyvinylidene chloride, a copolymer of vinyl chloride and vinyl acetate, and a copolymer of vinyl chloride and vinylidene chloride with about 0.5 to 10 parts, per hundred parts by weight of said resin, of an alkyl thioglycollate in which the alkyl group has about 6 to 20 carbon atoms and from about 0.0002 to 0.05 part metal, per hundred parts by weight of resin, of tin chloride.

23. A composition of matter comprising an admixture of a resin of the group consisting of polyvinyl chloride, polyvinylidene chloride, a copolymer of vinyl chloride and vinyl acetate, and a copolymer of vinyl chloride and vinylidene chloride with about 0.5 to 10 parts, per hundred parts by weight of said resin, of stearyl thioglycollate and from about 0.0002 to 0.05 part metal, per hundred parts by weight of resin, of zinc chloride.

24. A composition comprising an admixture of (1) about 100 parts by weight of a resin of the group consisting of polyvinyl chloride, polyvinylidene chloride, a copolymer of vinyl chloride and vinyl acetate, and a copolymer of vinyl chloride and vinylidene chloride (2) about ½ to 10 parts by weight of an ester of a mercapto-acid and a primary alcohol having the following general formula:

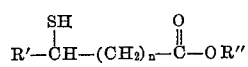

wherein $n$ is an integer from 0 to 5, where R' is hydrogen and where R'' is an alkyl group of about 6 to 20 carbon atoms, and (3) about 0.0002 to 0.05 part by weight of a metal selected from the group consisting of zinc and tin, the metal being a part of a metal salt which is free of carbon to metal bonds.

25. A composition of matter comprising an intimate thoroughly dispersed mixture of (1) about 100 parts by weight of a resin of the group consisting of polyvinyl chloride, polyvinylidene chloride, a copolymer of vinyl chloride and vinyl acetate, and a copolymer of vinyl chloride and vinylidene chloride, (2) about ½ to 10 parts by weight of an ester of a mercapto-acid and a primary alcohol having the following general formula:

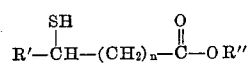

wherein $n$ is an integer from 0 to 5, where R' is selected from the group consisting of hydrogen and an alkyl group and where R'' is stearyl, and (3) about 0.0002 to 0.05 part by weight of a metal which is selected from the group consisting of zinc and tin, metal being part of a metal salt of a colorless Friedel-Crafts progenitor which is free of carbon to metal bonds.

26. A composition of matter comprising an admixture of (1) about 100 parts by weight of a resin of the group consisting of polyvinyl chloride, polyvinylidene chloride, a copolymer of vinyl chloride and vinyl acetate, and a copolymer of vinyl chloride and vinylidene chloride, (2) about 0.5 to 10 parts by weight of an alkyl thiopropionate in which the alkyl group has about 6 to 20 carbon atoms and (3) about 0.0002 to 0.05 part by weight of a metal which is selected from the group consisting of zinc and tin, the metal being a part of a metal salt which is free of carbon to metal bonds.

27. A composition of matter comprising an admixture of (1) about 100 parts by weight of a resin of the group consisting of polyvinyl chloride, polyvinylidene chloride, a copolymer of vinyl chloride and vinyl acetate, and a copolymer of vinyl chloride and vinylidene chloride, (2) about ½ to 10 parts by weight of an alkyl thioglycollate in which the alkyl group has about 8 to 18 carbon atoms and (3) about 0.0002 to 0.05 part by weight of a metal which is selected from the group consisting of zinc and tin, the metal being part of a metal salt which is free of carbon to metal bonds.

References Cited in the file of this patent

UNITED STATES PATENTS

| | | |
|---|---|---|
| 2,707,178 | Wilson | Apr. 26, 1955 |
| 2,790,785 | Ramsden et al. | Apr. 30, 1957 |
| 2,809,956 | Mack et al. | Oct. 15, 1957 |

UNITED STATES PATENT OFFICE
CERTIFICATE OF CORRECTION

Patent No. 3,067,166　　　　　　　　　　　December 4, 1962

Baruch Zaremsky

It is hereby certified that error appears in the above numbered patent requiring correction and that the said Letters Patent should read as corrected below.

Column 9, lines 11 to 13, the formula should appear as shown below instead of as in the patent:

$$R' - \overset{SH}{\underset{|}{C}}H - (CH_2)_n - \overset{O}{\underset{||}{C}} - OR''$$

Signed and sealed this 11th day of June 1963.

(SEAL)
Attest:

ERNEST W. SWIDER
Attesting Officer

DAVID L. LADD
Commissioner of Patents